US010379520B2

(12) United States Patent
Noda et al.

(10) Patent No.: US 10,379,520 B2
(45) Date of Patent: Aug. 13, 2019

(54) METHOD FOR CONTROLLING SHAPE MEASURING APPARATUS

(71) Applicant: Mitutoyo Corporation, Kawasaki, Kanagawa (JP)

(72) Inventors: Takashi Noda, Shimotsuke (JP); Hiromi Deguchi, Shimotsuke (JP); Norihiko Murata, Utsunomiya (JP)

(73) Assignee: MITUTOYO CORPORATION, Kawasaki (JP)

( * ) Notice: Subject to any disclaimer, the term of this patent is extended or adjusted under 35 U.S.C. 154(b) by 20 days.

(21) Appl. No.: 15/271,824

(22) Filed: Sep. 21, 2016

(65) Prior Publication Data

US 2017/0090455 A1 Mar. 30, 2017

(30) Foreign Application Priority Data

Sep. 25, 2015 (JP) ................................ 2015-188167

(51) Int. Cl.
*G01B 5/008* (2006.01)
*G01B 7/008* (2006.01)
(Continued)

(52) U.S. Cl.
CPC ........... *G05B 19/401* (2013.01); *G01B 5/008* (2013.01); *G01B 7/008* (2013.01); *G06F 17/16* (2013.01); *G05B 2219/23385* (2013.01)

(58) Field of Classification Search
CPC ........ G05B 19/401; G05B 2219/23385; G01B 7/008; G01B 5/008; G06F 17/16
(Continued)

(56) References Cited

U.S. PATENT DOCUMENTS 7,643,963 B2 1/2010 Noda et al.
2010/0245237 A1* 9/2010 Nakamura .............. A63F 13/02 345/156

(Continued)

FOREIGN PATENT DOCUMENTS

EP 1975557 10/2008
EP 2664891 11/2013

(Continued)

OTHER PUBLICATIONS

European Search Report dated Feb. 7, 2017, 7 pages.

*Primary Examiner* — Ziaul Karim
(74) *Attorney, Agent, or Firm* — Rankin, Hill & Clark LLP

(57) ABSTRACT

There is provided a method for controlling a shape measuring apparatus which can achieve both trajectory correcting capability and control stability. A stylus tip is moved along a scanning path while controlling the stylus tip so as to keep an amount of deflection of a probe to a workpiece to be a reference amount of deflection. A movement instruction for the probe is generated according to a combined velocity vector V represented by the following expression:

combined velocity vector $V=Gf\cdot Vf+Ge\cdot Ve+Gc\cdot Vc2$, where Vf is a path velocity vector to move the probe along the scanning path, Ve is a deflection correcting vector to keep the amount of deflection of the probe to the workpiece to be the reference amount of deflection, Vc2 is a second trajectory correcting vector represented by $(Vc1\cdot q)q$, Vc1 is a first trajectory correcting vector to correct a position of the probe so that the stylus tip heads to the scanning path, and (Continued)

q is a trajectory correcting direction vector given by a vector product of a normal line of a surface of the workpiece and the path velocity vector Vf.

3 Claims, 9 Drawing Sheets

(51) Int. Cl.
*G06F 17/16* (2006.01)
*G05B 19/401* (2006.01)

(58) Field of Classification Search
USPC .......................................................... 700/186
See application file for complete search history.

(56) References Cited

U.S. PATENT DOCUMENTS

| | | | | |
|---|---|---|---|---|
| 2013/0283627 | A1* | 10/2013 | Noda | G01B 21/04 33/503 |
| 2013/0310962 | A1* | 11/2013 | Noda | G01B 21/04 700/97 |
| 2014/0025336 | A1 | 1/2014 | Noda et al. | |
| 2014/0076015 | A1* | 3/2014 | Riemeier | B21F 1/008 72/37 |

FOREIGN PATENT DOCUMENTS

| | | |
|---|---|---|
| EP | 2687816 | 1/2014 |
| JP | 2008-241420 | 10/2008 |
| JP | 2013-238573 | 11/2013 |
| JP | 2014-21004 | 2/2014 |

* cited by examiner

METHOD FOR CONTROLLING SHAPE MEASURING APPARATUS

INCORPORATION BY REFERENCE

This application is based upon and claims the benefit of priority from Japanese patent application No. 2015-188167, filed on Sep. 25, 2015, the disclosure of which are incorporated herein in its entirety by reference.

BACKGROUND OF THE INVENTION

1. Field of the Invention

The present invention relates to a method for controlling a shape measuring apparatus.

2. Description of Related Art

There is known a shape measuring apparatus which measures a shape of an object to be measured by moving a stylus tip along a surface of the object to be measured while scanning the surface (for example, JP 2008-241420 A, JP 2013-238573 A, JP 2014-21004 A).

To perform scanning measurement, a path for the scanning measurement needs to be prepared. The apparatus disclosed in JP 2008-241420 A converts design data based on CAD data (for example, non-uniform rational B-spline (NURBS) data) into a group of polynomials curves in a predetermined degree.

This procedure is briefly described below.

First, CAD data (for example, NURBS data) including path information is received from an external CAD system and converted into data of a group of points. The data of each point is a combination of coordinates (x,y,z) and normal line directions (P,Q,R) (that is, (x,y,z,P,Q,R)). Hereinafter, the data of the group of points including the information (x,y,z,P,Q,R) is referred to as “contour point data” for the sake of the description below.

Next, the coordinates of each point are offset in the normal line direction by a predetermined amount. (The predetermined amount is, specifically, a stylus tip radius r−a reference amount of deflection E0). The data of the group of points data obtained in this manner is referred to as “offset contour point data”.

Then, the offset contour point data is converted into a group of polynomial curves in a predetermined degree.

Here, it is assumed that the polynomial is a cubic function, and the curves are parametric cubic curves (PCC). A path for measuring a workpiece is generated based on the PCC curve. Furthermore, the PCC curve is divided into a group of divided PCC curves.

By calculating a speed curve from the group of divided PCC curves, a moving speed (movement vector) of a probe is calculated.

(For example, the moving speed (movement vector) of the probe is set based on the curvature of each segment of the group of divided PCC curves or the like.)

By moving the probe based on the moving speed calculated in this manner, the stylus tip is moved while scanning the surface of the object to be measured (passive nominal scanning measurement: note that the word “nominal” in this description means scanning along a predetermined trajectory calculated in advance based on design data of an object).

Furthermore, there is known a method for performing scanning measurement while correcting a trajectory by continuously calculating a deflection correcting vector so as to keep an amount of deflection of a probe to be constant (JP 2013-238573 A).

Hereinafter, such nominal scanning is referred to as active nominal scanning measurement.

The active nominal scanning measurement disclosed in JP 2013-238573 A is briefly described.

In the active nominal scanning measurement, a combined velocity vector V represented by the following Expression 1 is a movement instruction for a probe.

The probe is moved based on the combined velocity vector V, and thereby scanning measurement to a workpiece surface in which the probe (stylus tip) moves along a PCC curve and an amount of deflection is constant, that is, active nominal scanning measurement is implemented.

$$V=Gf\times Vf+Ge\times Ve+Gc\times Vc \quad \text{(Expression 1)}$$

With reference to FIG. 1, Expression 1 is briefly described.

In FIG. 1, there is a PCC curve (that is, a scanning path) at the position offset from the design data (contour point data) by a predetermined amount (a stylus tip radius r−a reference amount of deflection E0). Furthermore, in FIG. 1, the actual workpiece is slightly shifted from the design data.

The vector Vf is a path velocity vector. The path velocity vector Vf has a direction from an interpolation point (i) on the PCC curve to the next interpolation point (i+1). Note that, the magnitude of the path velocity vector Vf is determined based on, for example, the curvature of the PCC curve at the interpolation point (i) (for example, JP 2014-21004 A).

The vector Ve is a deflection correcting vector to keep the amount of deflection Ep of the probe to be a predetermined reference amount of deflection E0 (for example, 0.3 mm).

(The deflection correcting vector Ve is necessarily to be parallel to the normal line of the workpiece surface.)

The vector Vc is a trajectory correcting vector. The trajectory correcting vector Vc is parallel to a perpendicular from the probe position to the PCC curve.

In Expression 1, Gf, Ge, and Gc are a scanning driving gain, a deflection correcting gain, and a trajectory correcting gain respectively.

SUMMARY OF THE INVENTION

By controlling a movement of a probe with a combined velocity vector V of Expression 1, active nominal scanning measurement can be implemented, but the control can be unstable depending on the direction of each vector.

For example, in FIG. 1, the direction of the trajectory correcting vector Vc is opposite to the direction of the deflection correcting vector Ve. Thus, the probe 230 can be vibrated.

For that reason, the values of Gf, Ge, and Gc are to be adjusted by functions f1(C,E), f2(E), and f3(C) respectively in JP 2013-238573.

However, as the value of Ge or Gc is reduced to suppress the vibration, the magnitude of the combined velocity vector V naturally decreases. Then, the trajectory correcting capability or the deflection correcting capability also decreases.

Thus, it has been difficult to achieve both the trajectory correcting capability and the control stability.

A purpose of the present invention is to provide a method for controlling a shape measuring apparatus which can achieve both trajectory correcting capability and control stability.

A method for controlling a shape measuring apparatus in an aspect of the present invention is the method for controlling the shape measuring apparatus including a probe having a stylus tip at a tip and a moving mechanism which moves the probe, and configured to measure a shape of a workpiece by detecting a contact between the stylus tip and a surface of the workpiece, the method including:

in order to calculate a scanning path to move the stylus tip based on design data of the workpiece, and to move the stylus tip along the scanning path while controlling the stylus tip so as to keep an amount of deflection of the probe to the workpiece to be a reference amount of deflection, generating a movement instruction for the probe according to a combined velocity vector V represented by a following expression:

combined velocity vector $V=Gf\cdot Vf+Ge\cdot Ve+Ge\cdot Vc2$, where Vf is a path velocity vector to move the probe along the scanning path, Ve is a deflection correcting vector to keep the amount of deflection of the probe to the workpiece to be the reference amount of deflection, Vc2 is a second trajectory correcting vector represented by $(Vc1\cdot q)q$, Vc1 is a first trajectory correcting vector to correct a position of the probe so that the stylus tip heads to the scanning path, q is a trajectory correcting direction vector given by a vector product of a normal line of the surface of the workpiece and the path velocity vector Vf, and Gf, Ge, and Gc are a scanning driving gain, a deflection correcting gain, and a trajectory correcting gain respectively.

In an aspect of the present invention, it is preferable that the deflection correcting vector Ve is given by $K(|Ep|-E0)eu$, where Ep is sensor output of the probe, E0 is the reference amount of deflection, and eu is a unit vector in a displacement direction of the probe.

In an aspect of the present invention, it is preferable that the trajectory correcting direction vector q is represented by $eu\times Vf/|eu\times Vf|$ or $Vf\times eu/|Vf\times eu|$.

A recording medium in an aspect of the present invention is a nonvolatile recording medium recording a control program for causing a computer to execute a method for controlling a shape measuring apparatus.

DETAILED DESCRIPTION

Figure 1:
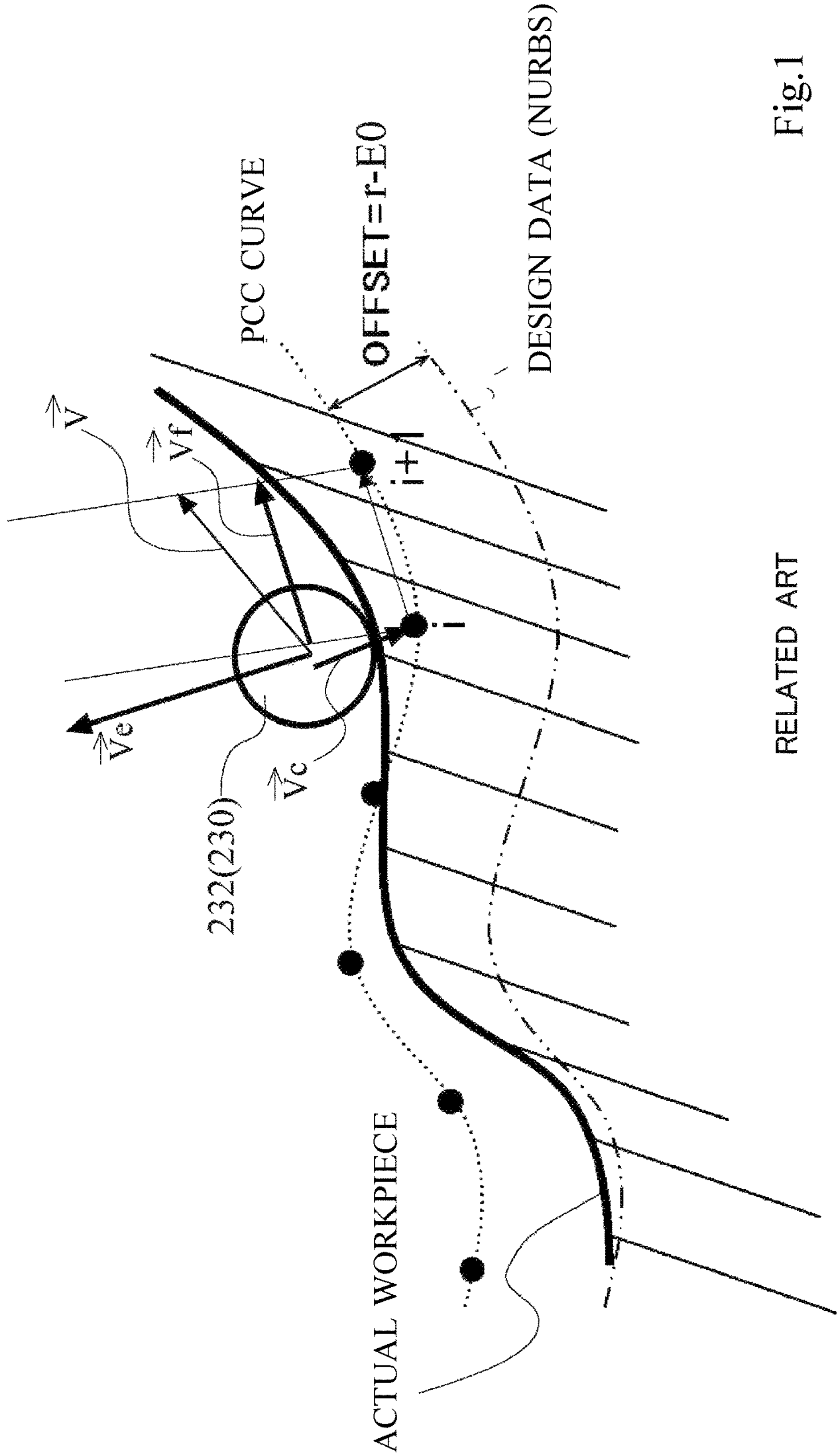
FIG. 1 is a diagram illustrating an example of each element of a combined velocity vector V as a related art.

An embodiment of the present invention is illustrated and described with reference to reference signs attached to the elements in the drawings.

First Exemplary Embodiment

A first exemplary embodiment of the present invention is described below.

Since the basic operation procedure of active nominal scanning measurement has been disclosed in other literatures (for example, JP 2008-241420 A), a main feature of the present embodiment, that is, generation of a combined velocity vector V is described.

First, a basic configuration of a shape measuring system 100 is briefly described.

Figure 2:
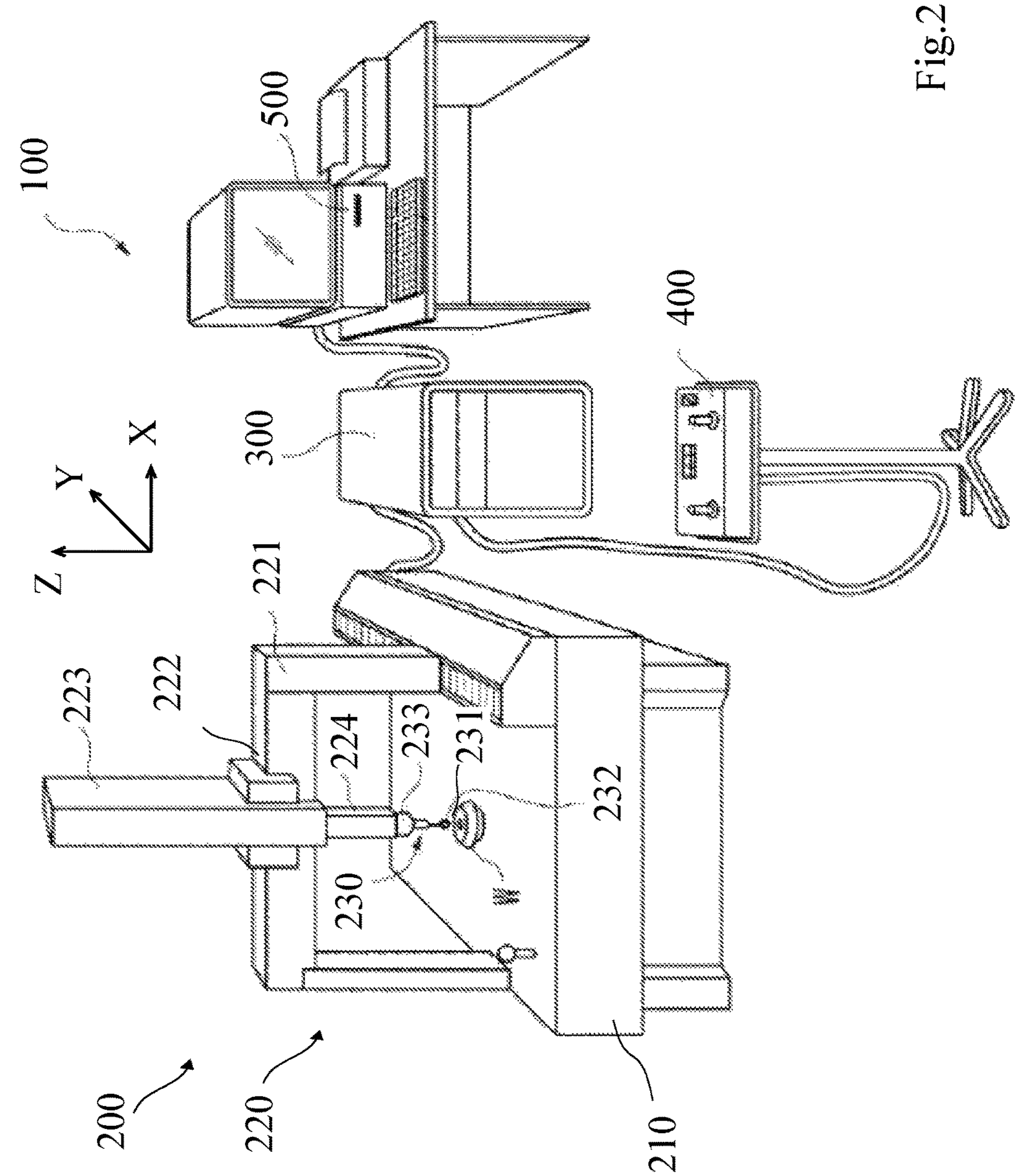
FIG. 2 is a diagram illustrating a configuration of an entire shape measuring system.

FIG. 2 is a diagram illustrating the entire configuration of the shape measuring system 100.

The shape measuring system 100 includes a coordinate measuring machine 200, a motion controller 300 which control the drive of the coordinate measuring machine 200, and a host computer 500 which controls the motion controller 300 and performs necessary data processing.

The coordinate measuring machine 200 includes a base 210, a moving mechanism 220, and a probe 230.

The moving mechanism 220 includes a gate type Y slider 221, an X slider 222, a Z axis column 223, and a Z spindle 224. The Y slider 221 is provided slidably on the base 210 in the Y direction. The X slider 222 slides along a beam of the Y slider 221 in the X direction. The Z axis column 223 is secured to the X slider 222. The Z spindle 224 moves up and down inside the Z axis column 223 in the Z direction.

A driving motor (not illustrated) and an encoder (not illustrated) are fixed on each of the Y slider 221, the X slider 222, and the Z spindle 224.

Drive control signals from the motion controller 300 control the drive of the driving motors.

The encoder detects a moving amount of each of the Y slider 221, the X slider 222, and the Z spindle 224, and outputs the detection value to the motion controller 300.

The probe 230 is attached to the lower end of the Z spindle 224.

The probe 230 includes a stylus 231 and a supporting part 233. The stylus 231 has a stylus tip 232 at a tip side (−Z axis direction side). The supporting part 233 supports the base end side (+Z axis direction side) of the stylus 231.

The stylus tip 232 has a spherical shape and is brought into contact with an object to be measured W.

When an external force is applied to the stylus 231, that is, when the stylus tip 232 is brought into contact with the object to be measured W, the supporting part 233 supports the stylus 231 so that the stylus 231 is movable in the directions of the X, Y, and Z axes within a certain range.

The supporting part 233 further includes a probe sensor (not illustrated) to detect a position of the stylus 231 in each axis direction. The probe sensor outputs the detection value to the motion controller 300.

(Configuration of the Motion Controller 300)

Figure 3:
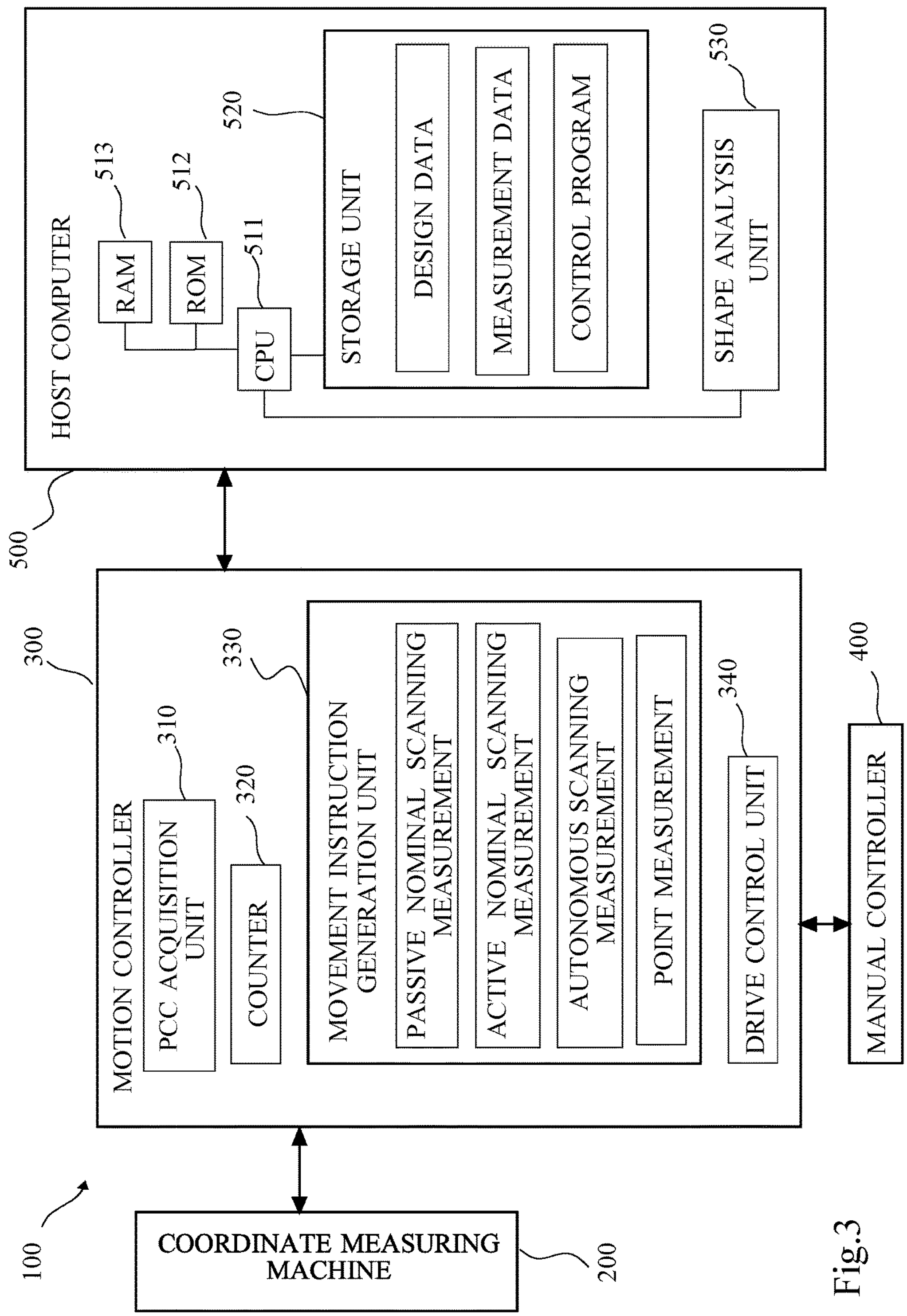
FIG. 3 is a functional block diagram of a motion controller and a host computer.

FIG. 3 is a functional block diagram of the motion controller 300 and the host computer 500.

The motion controller 300 includes a PCC acquisition unit 310, a counter 320, a movement instruction generation unit 330, and a drive control unit 340.

The PCC acquisition unit 310 acquires PCC curve data from the host computer 500.

The counter 320 measures a displacement amount of each slider by counting detection signals output from the encoder, and measures a displacement amount of the probe 230 (the stylus 231) by counting detection signals output from each sensor of the probe 230.

From the measured displacement amounts of the slider and the probe 230, a coordinate position PP (hereinafter, referred to as a probe position PP) of the stylus tip 232 is obtained.

Furthermore, from the displacement amount of the stylus 231 (the detection value of the probe sensor (Px, Py, Pz))

measured by the counter 320, an amount of deflection (an absolute value of a vector Ep) of the stylus tip 232 is obtained.

The movement instruction generation unit 330 calculates a movement path for the probe 230 (the stylus tip 232) to measure the surface of the object to be measured W with the probe 230 (the stylus tip 232), and calculates a velocity vector along the movement path.

The movement instruction generation unit 330 includes functional units to calculate a path according to measurement methods (measurement modes).

Specifically, there are four methods of passive nominal scanning measurement, active nominal scanning measurement, autonomous scanning measurement, point measurement. The active nominal scanning measurement relates to the present embodiment.

The drive control unit 340 controls the drive of each slider based on the movement vector calculated by the movement instruction generation unit 330.

Note that, a manual controller 400 is connected to the motion controller 300.

The manual controller 400 includes a joystick and various buttons, receives a manual input operation from a user, and transmits the user's operation instruction to the motion controller 300.

In this case, the motion controller 300 (the drive control unit 340) controls the drive of each slider in response to the user's operation instruction.

(Configuration of the Host Computer 500)

The host computer 500 includes a central processing unit (CPU) 511 and a memory, and controls the coordinate measuring machine 200 through the motion controller 300.

The host computer 500 further includes a storage unit 520 and a shape analysis unit 530.

The storage unit 520 stores design data, such as CAD data or NURBS data, related to the shape of the object to be measured (workpiece) W, measurement data obtained by measurement, and a measurement control program to control an overall measurement operation.

The shape analysis unit 530 calculates surface shape data of the object to be measured W based on the measurement data output from the motion controller 300, and performs shape analysis to calculate an error or distortion of the calculated surface shape data of the object to be measured W.

The shape analysis unit 530 further performs arithmetic processing, such as conversion of the design data (CAD data, NURBS data, or the like) into PCC curves.

The CPU 511 executes the measurement control program, and thereby the measurement operation of the present embodiment is implemented.

An output device (a display or a printer) and an input device (a keyboard or a mouse) are connected to the host computer 500 as needed.

Next, generation of a combined velocity vector V which is a main feature of the present embodiment is described below.

Figure 4:
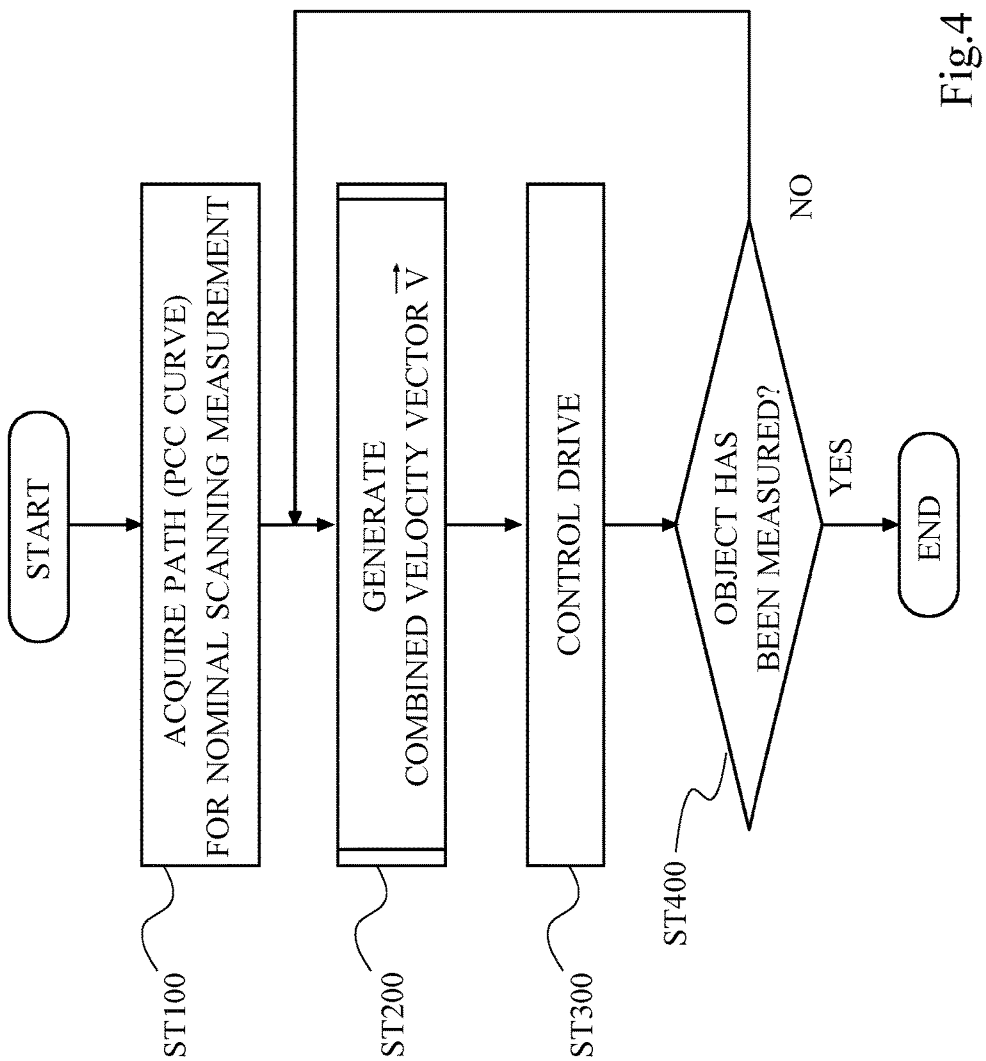
FIG. 4 is a flowchart explaining overall control of active nominal scanning measurement.

FIG. 4 is a flowchart explaining overall control of active nominal scanning measurement.

The host computer 500 generates a PCC curve, and the generated PCC curve is transmitted to the motion controller 300 (ST100).

Then, the motion controller 300 generates a combined velocity vector V which is a movement instruction for performing active nominal scanning measurement to a workpiece surface with a path along the PCC curve (ST200).

The generation of the combined velocity vector V is described below.

Figure 5:
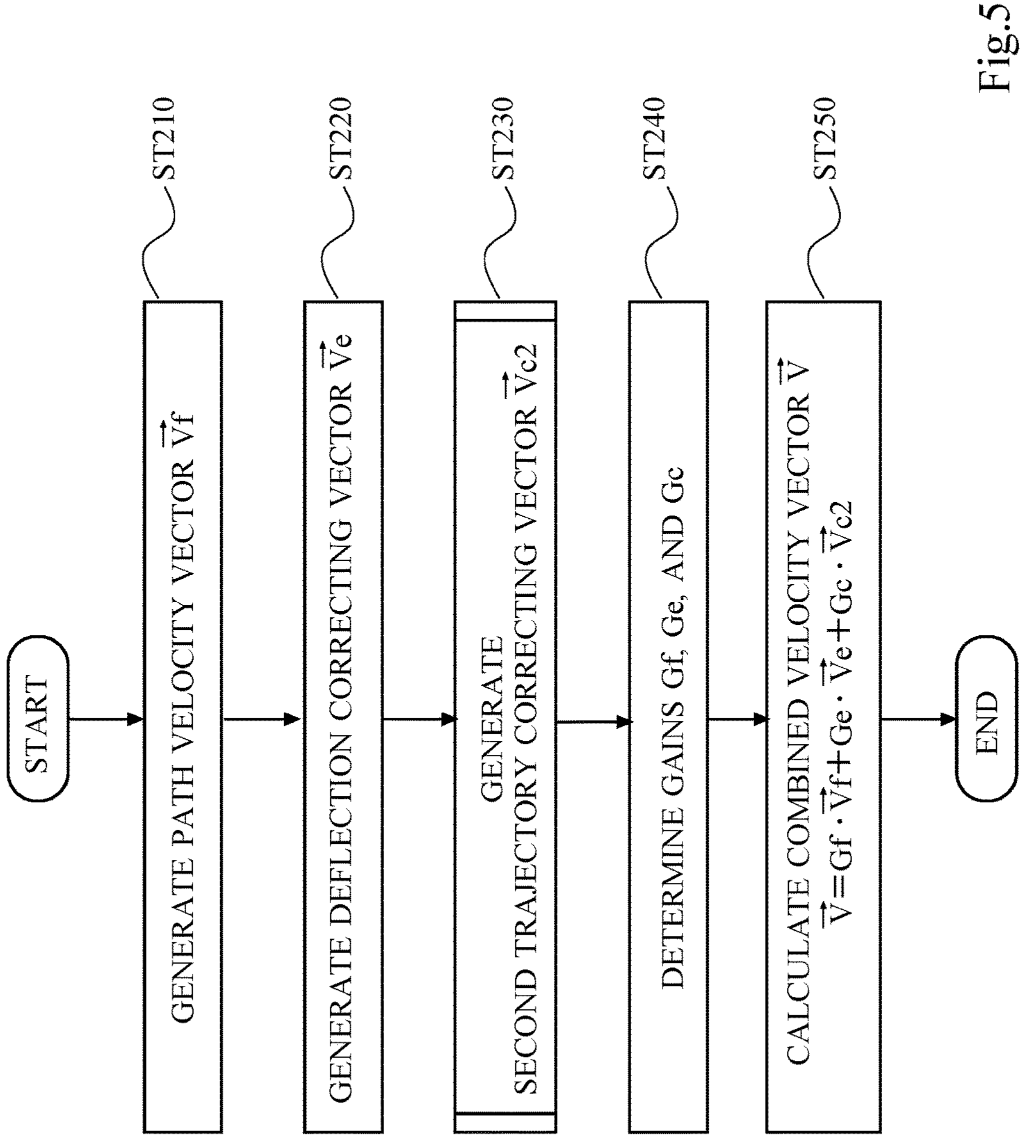
FIG. 5 is a flowchart explaining a procedure to generate a combined velocity vector V.

FIG. 5 is a flowchart explaining a procedure to generate the combined velocity vector V.

The combined velocity vector V is obtained by combining a path velocity vector Vf (ST210), a deflection correcting vector Ve (ST220), and a second trajectory correcting vector Vc2 (ST230).

Here, the difference between the conventional technique and the present embodiment of the present invention is the second trajectory correcting vector Vc2 (ST230).

First, a path velocity vector Vf is generated (ST210)

Figure 6:
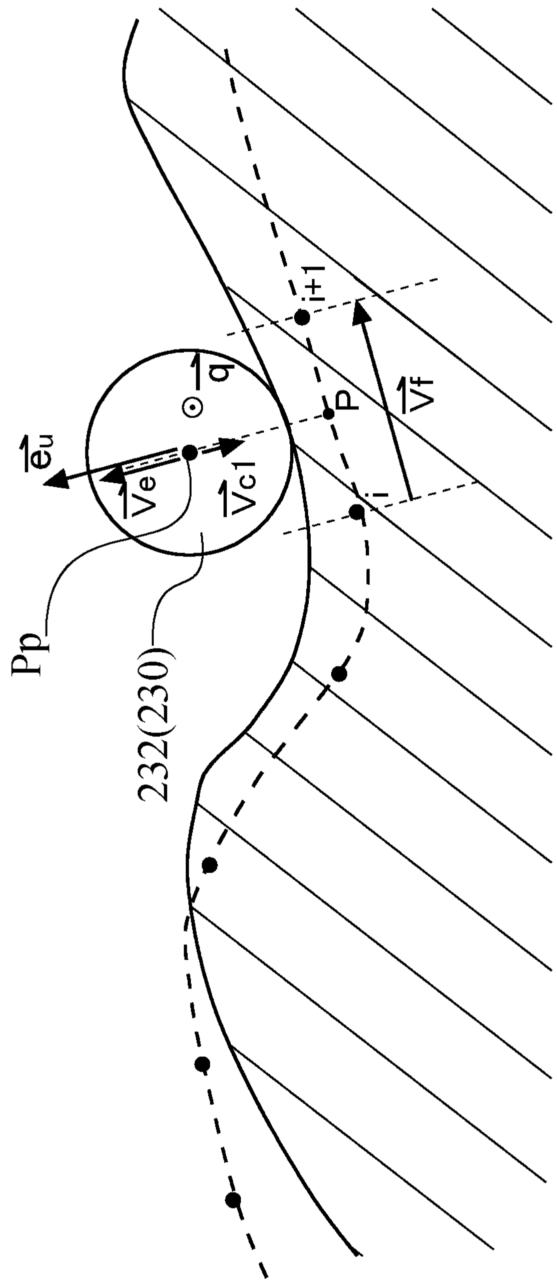
FIG. 6 is a diagram explaining a procedure to generate a combined velocity vector V.

It is assumed that an interpolation point i and the next interpolation point (i+1) are on a path (PCC curve), the direction of the path velocity vector Vf is from the point i to the point (i+1) (see FIG. 6).

The magnitude of the path velocity vector Vf is set according to, for example, the curvature of the PCC curve at the point i (JP 2014-21004).

Note that, the point P on the PCC curve is described later.

Next, a deflection correcting vector Ve is generated.

The deflection correcting vector Ve is represented by the following expression:

$$\vec{V}e=K(|\vec{E}p|-E_0)\vec{e}_u \qquad \text{(Expression 2)}$$

In Expression 1, Ep is a probe displacement vector obtained from probe output.

Ep=(xp,yp,zp)

Thus, the amount of deflection |Ep| of the probe is represented by the following expression:

$$|\vec{E}p|=\sqrt{x_p^2+y_p^2+z_p^2} \qquad \text{(Expression 3)}$$

In Expression 2, eu is assumed to be a unit vector in the probe displacement direction obtained from the probe output.

$$\vec{e}_u=\vec{Ep}/|\vec{E}p| \qquad \text{(Expression 4)}$$

Then, the deflection correcting vector Ve to keep the amount of deflection |Ep| to be a reference amount of deflection E0 is represented by Expression 2.

Note that, K is an arbitrary coefficient.

Next, a second trajectory correcting vector Vc2 is generated.

Figure 7:
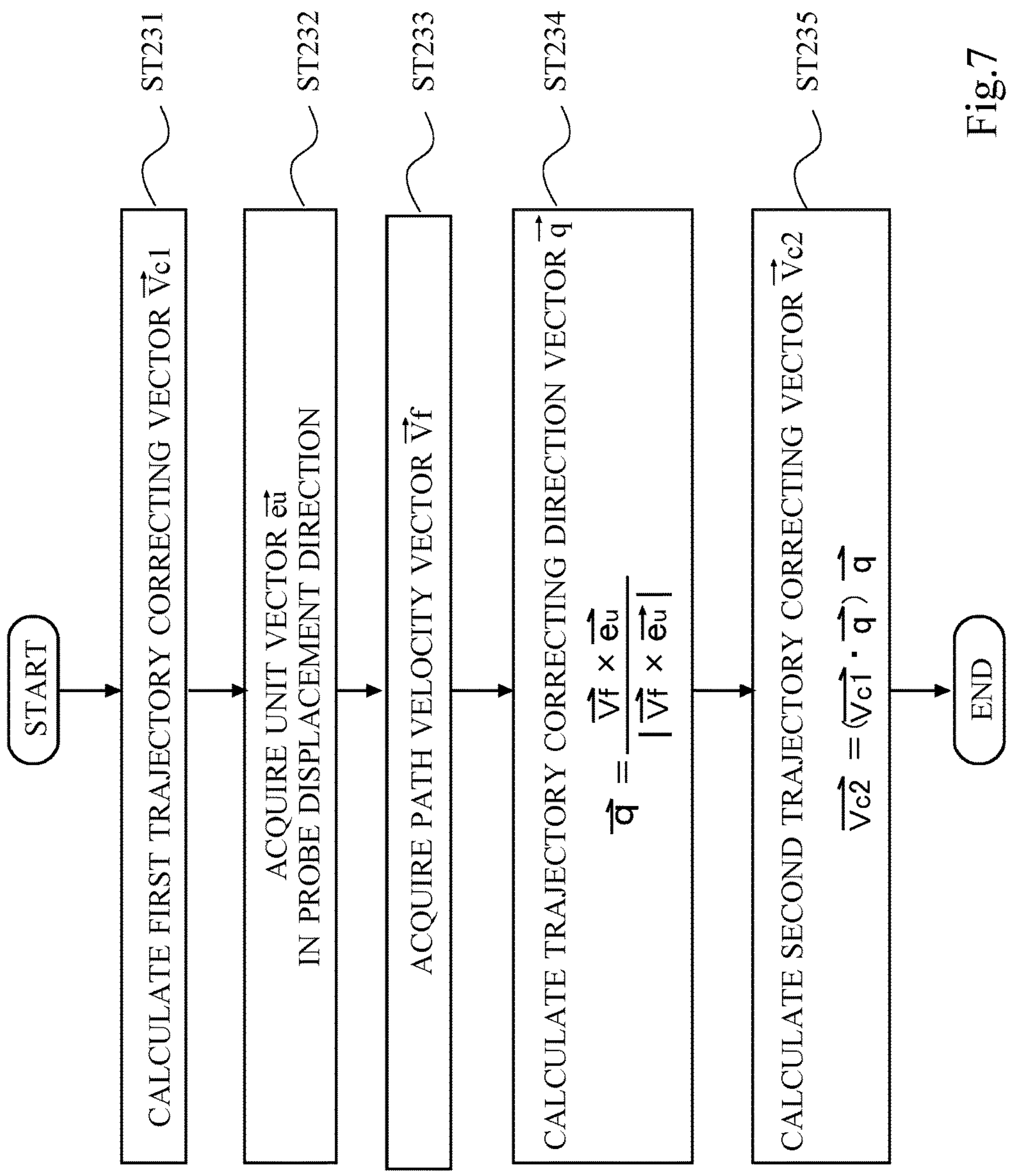
FIG. 7 is a flowchart explaining a procedure to generate a second trajectory correcting vector Vc2.

FIG. 7 is a flowchart explaining a procedure to generate the second trajectory correcting vector Vc2. The second trajectory correcting vector Vc2 is described with reference to the flowchart in FIG. 7.

To generate a second trajectory correcting vector Vc2, first, a first trajectory correcting vector Vc1 is calculated.

The first trajectory correcting vector Vc1 is the same as the trajectory correcting vector Vc in the conventional technique (JP 2013-238573), but is differently referred to for the sake of the description.

A perpendicular is drawn from a probe position Pp to the path (PCC curve) (see FIG. 6). The foot of the perpendicular is referred to as P.

The vector in the direction from the probe position Pp to the point P is the first trajectory correcting vector Vc1.

In the present embodiment, the first trajectory correcting vector Vc1 is not used directly, but used after extracting the elements effective for trajectory correcting.

In ST232, the unit vector eu in the probe displacement direction is acquired. The unit vector eu in the probe displacement direction has been described in the description of generating the deflection correcting vector Ve.

Next, in ST233, the path velocity vector Vf is acquired. The path velocity vector Vf has been described in ST210.

By using the unit vector eu in the probe displacement direction and the path velocity vector Vf, a trajectory correcting direction vector q is calculated (ST234).

The trajectory correcting direction vector q is a unit vector parallel to the vector product of the unit vector eu in the probe displacement direction and the path velocity vector Vf.

In FIG. 6, when it is assumed that the path velocity vector Vf and the unit vector eu in the probe displacement direction are on a paper sheet, the direction of the trajectory correcting direction vector q is perpendicular to the paper sheet.

$$\vec{q}=\vec{V}_f\times\vec{e}_u/|\vec{V}_f\times\vec{e}_u|$$

Note that, the vector product "Vf×eu" may be replaced with "eu×Vf", because the direction of the arrow is not important.

The second trajectory correcting vector Vc2 is an element in the q direction of the first trajectory correcting vector Vc1.

In other words, when the scalar product of the first trajectory correcting vector Vc1 and the trajectory correcting direction vector q is represented by (Vc1·q), the second trajectory correcting vector Vc2 is represented by the following expression (ST235).

$$\vec{V}c2=(\vec{V}c1\cdot\vec{q})\vec{q}$$

The second trajectory correcting vector Vc2 is generated in this manner.

Figure 8:
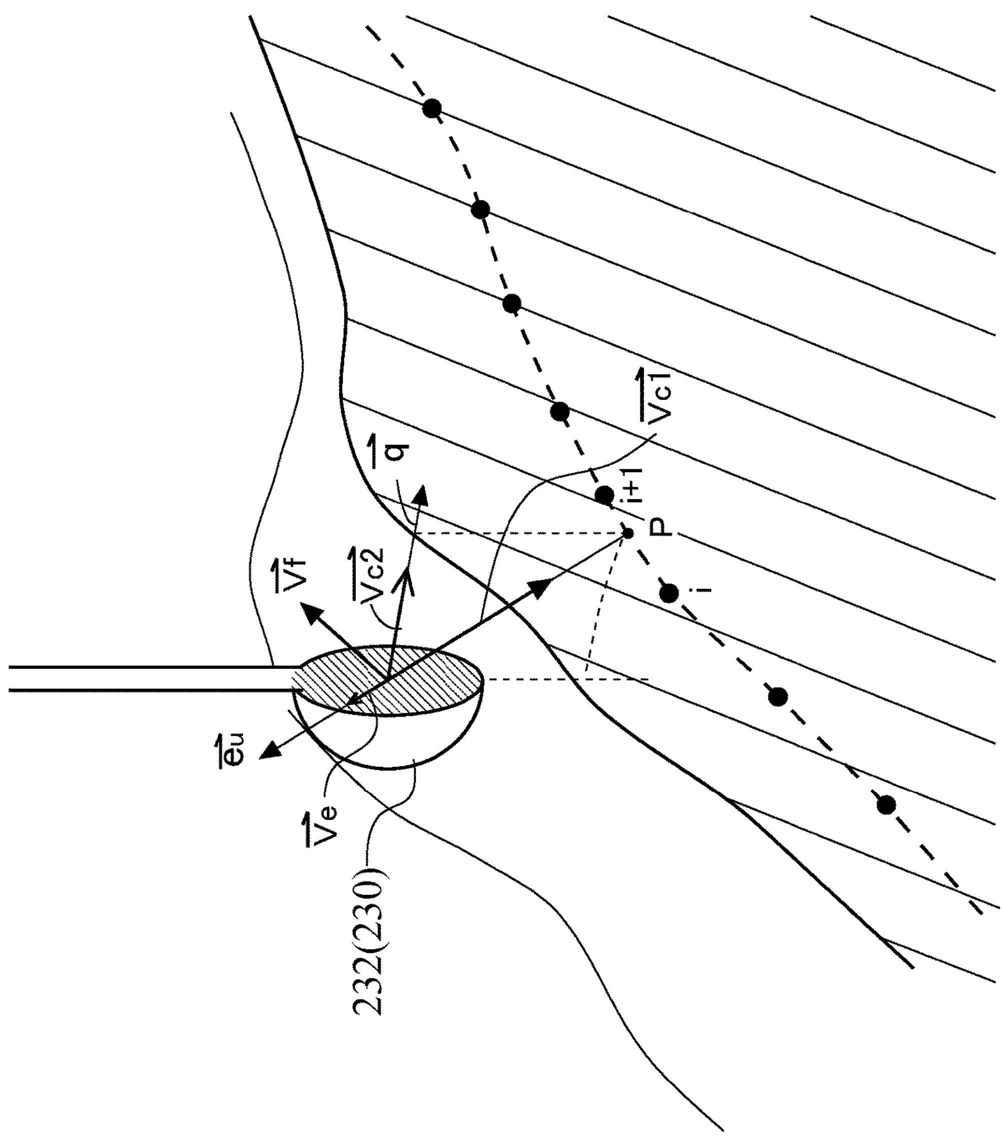
FIG. 8 is a diagram illustrating relative directional relations between vectors.

FIG. 8 is a diagram illustrating an example of a relative directional relation of each vector.

This shows that the direction of the second trajectory correcting vector Vc2 is perpendicular to the unit vector eu having the probe displacement direction and the path velocity vector Vf.

Then, by the trajectory correcting of the second trajectory correcting vector Vc2, the position of the probe 230 is corrected so as to head to the point where the distance between the center of the stylus tip and the PCC curve is minimized on the workpiece surface.

Once the second trajectory correcting vector Vc2 is obtained, returning back to the flowchart in FIG. 5, the gains Gf, Ge, and Gc are determined (ST240). The gains Gf, Ge, and Gc are each appropriately adjusted with a predetermined function (for example, JP 2013-238573). For example, when trajectory deviation or deflection deviation is large, the gain Gf is adjusted so as to be reduced.

Then, by combining the path velocity vector Vf, the deflection correcting vector Ve, and the second trajectory correcting vector Vc2, the combined velocity vector V is calculated (ST250).

By controlling the movement of the probe 230 based on the combined velocity vector V (ST300), the active nominal scanning measurement with a constant amount of deflection is implemented.

An effect caused by using the combined velocity vector V is described below.

The conventional control using the first trajectory correcting vector Vc1 is the simplest as trajectory correcting and needs less calculation amounts, but the probe 230 can be vibrated.

For example, as illustrated in FIGS. 1 and 8, the first trajectory correcting vector Vc1 can have elements in the directions opposite to the deflection correcting vector Ve and the path velocity vector Vf.

In an actual case, the first trajectory correcting vector Vc1 and the deflection correcting vector Ve are reversed and frequently interfered with each other. This is because the direction of the deflection correcting vector Ve is constantly changed according to the roughness of the workpiece surface.

When the first trajectory correcting vector Vc1, the deflection correcting vector Ve, and the path velocity vector Vf are combined in the case in which the first trajectory correcting vector Vc1 has the element in the direction opposite to the deflection correcting vector Ve or the path velocity vector Vf, the elements of these vectors are interfered with each other, and the movement of the probe 230 becomes unstable.

Thus, by appropriately adjusting the gains Gf, Ge, and Gc, the mutual interference between the first trajectory correcting vector Vc1, the deflection correcting vector Ve, and the path velocity vector Vf can be minimized.

However, if any one of the gains Gf, Ge, and Gc is reduced to minimize the mutual interference, the combined velocity vector V itself decreases, and the trajectory correcting capability inevitably decreases.

In contrast, in the present embodiment, the direction of the second trajectory correcting vector Vc2 is to be orthogonal to the unit vector eu having the probe displacement direction and the path velocity vector Vf.

Thus, the second trajectory correcting vector Vc2 is no longer interfered with the deflection correcting vector Ve, and the control becomes stable.

Note that, it has been experimentally confirmed that active nominal scanning measurement is implemented by using the second trajectory correcting vector Vc2.

Comparative Example

To further clarify the effect of the embodiment, a comparative example is described below.

The comparative example has been once examined as a modification of the first trajectory correcting vector Vc1, but has not been put into practice because of another problem.

In the comparative example, the first trajectory correcting vector Vc1 is referred to as a sub-trajectory correcting vector Vc1'.

The sub-trajectory correcting vector Vc1' is obtained by extracting the element orthogonal to the probe displacement direction unit vector eu among the elements of the first trajectory correcting vector Vc1.

Figure 9:
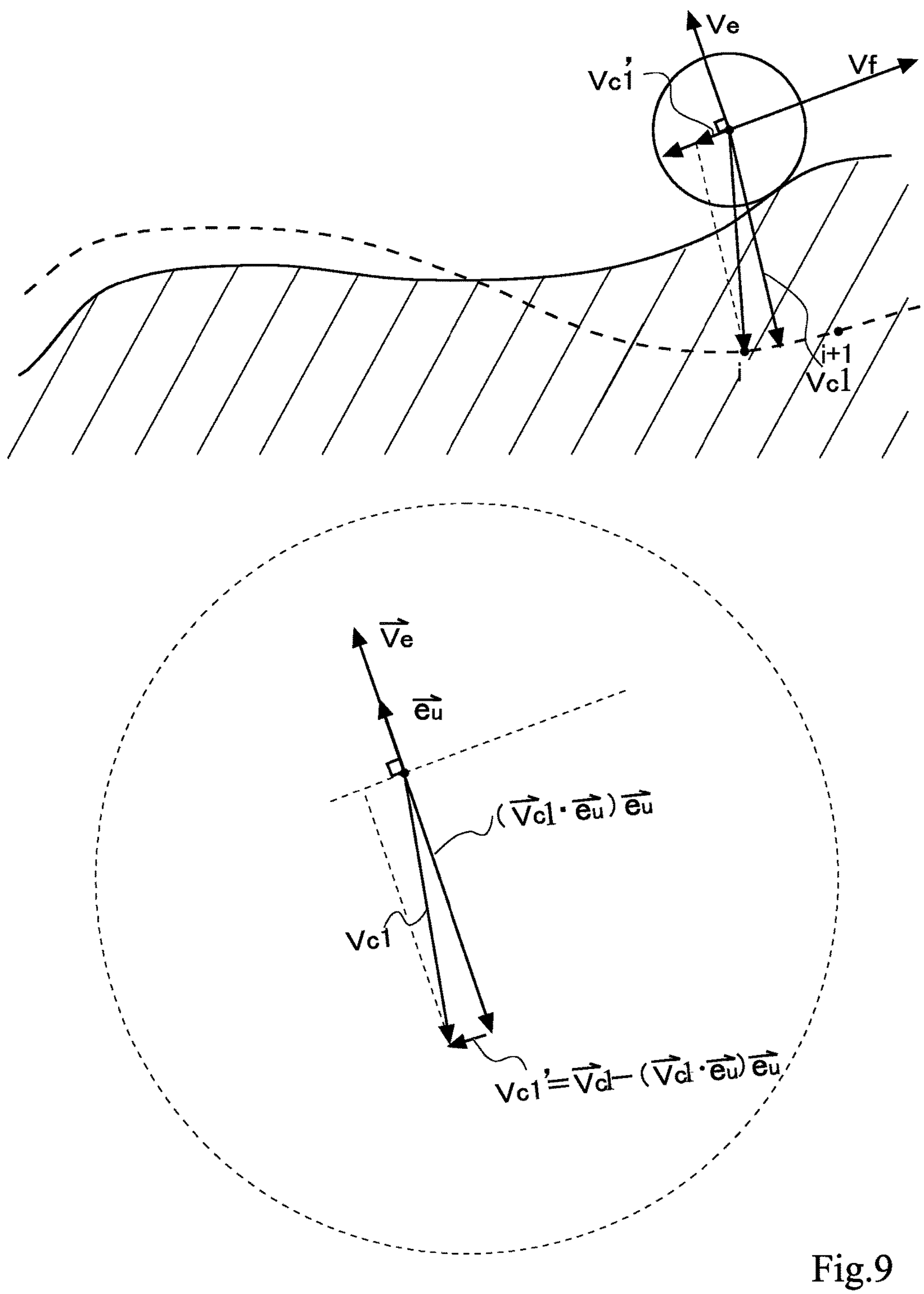
FIG. 9 is a diagram illustrating a comparative example.

In a part enclosed with a broken line in FIG. 9, an example of the direction of each vector is illustrated.

The sub-trajectory correcting vector Vc1' is represented by the following expression:

$$\vec{V}c1'=\vec{V}c1-(\vec{V}c1\cdot\vec{e}_u)\vec{e}_u$$

The sub-trajectory correcting vector Vc1' is orthogonal to the deflection correcting vector Ve. Thus, the vibration of the probe 230 due to the interference between the first trajectory correcting vector Vc1 and the deflection correcting vector Ve can be solved.

However, another problem has arisen.

For example, it is a typical case that a probe ascends a slope as illustrated in FIG. 9, and the sub-trajectory correcting vector Vc1' can have an element in the direction opposite to the path velocity vector Vf in this case.

If the shift between the workpiece and the design data is slightly large or if the inclination of the slope is large, the sub-trajectory correcting vector Vc1' becomes larger than the path velocity vector Vf, and the probe 230 may not be able to ascend the slope. For example, the control becomes difficult when the inclination of the ascending slope exceeds 20°.

In contrast, the second trajectory correcting vector Vc2 is to be orthogonal not only to the deflection correcting vector Ve but also to the path velocity vector Vf. Thus, the workpiece surface has an any shape, the active nominal scanning measurement is stably implemented.

Note that, the present invention is not limited to the above embodiment, and can be appropriately changed without deviating from the scope.

The invention claimed is:

1. A method for controlling a shape measuring apparatus including a probe having a stylus tip at a tip and a moving mechanism which moves the probe, and configured to measure a shape of a workpiece by detecting a contact between the stylus tip and a surface of the workpiece, the shape measuring apparatus comprising a coordinate measuring machine, a motion controller including a movement instruction generation unit, and a host computer, the method comprising:

in order to calculate a scanning path to move the stylus tip based on design data of the workpiece, and to move the stylus tip along the scanning path while controlling the stylus tip so as to keep an amount of deflection of the probe to the workpiece to be a reference amount of deflection, generating a movement instruction by the motion controller for the probe according to a combined velocity vector V calculated by the movement instruction generation unit represented by a following expression:

combined velocity vector $V=Gf\cdot Vf+Ge\cdot Ve+Gc\cdot Vc2$, wherein Vf is a path velocity vector to move the probe along the scanning path, Ve is a deflection correcting vector to keep the amount of deflection of the probe to the workpiece to be the reference amount of deflection, and is given by $K(|Ep|-E0)eu$ where Ep is sensor output of the probe, E0 is the reference amount of deflection, and eu is a unit vector in a displacement direction of the probe, Vc1 is a first trajectory correcting vector which is parallel to a perpendicular from the probe portion to the nominal scanning path, in order to correct a position of the probe so that the stylus tip heads to the scanning path, q is a trajectory correcting direction vector calculated by a vector product of the unit vector in a displacement direction of the probe eu and the path velocity vector Vf, Vc2 is a second trajectory correcting vector determined by the first trajectory correcting vector Vc1 and the trajectory correcting direction vector q, and represented by $(Vc1\cdot q)q$, Gf, Ge, and Gc are a scanning driving gain, a deflection correcting gain, and a trajectory correcting gain respectively, and a direction of the second trajectory correcting vector Vc2 is orthogonal to the unit vector eu having the probe displacement direction and the path velocity vector Vf, and controlling movement of the probe in the shape measuring apparatus based on the combined velocity vector V, wherein Vc2 is parallel to a contact portion of the workpiece where the stylus tip contacts the workpiece, and Vc2 is perpendicular to eu and Vf.

2. The method for controlling the shape measuring apparatus according to claim 1, wherein the trajectory correcting direction vector q is represented by $eu\times Vf/|eu\times Vf|$ or $Vf\times eu/|Vf\times eu|$.

3. A nonvolatile recording medium recording a control program for causing a computer to execute a method for controlling a shape measuring apparatus including a probe having a stylus tip at a tip and a moving mechanism which moves the probe, and configured to measure a shape of a workpiece by detecting a contact between the stylus tip and a surface of the workpiece, the shape measuring apparatus comprising a coordinate measuring machine, a motion controller including a movement instruction generation unit, and a host computer, the method comprising:

in order to calculate a scanning path to move the stylus tip based on design data of the workpiece, and to move the stylus tip along the scanning path while controlling the stylus tip so as to keep an amount of deflection of the probe to the workpiece to be a reference amount of deflection, generating a movement instruction by the motion controller for the probe according to a combined velocity vector V calculated by the movement instruction generation unit represented by a following expression:

combined velocity vector $V=Gf\cdot Vf+Ge\cdot Ve+Gc\cdot Vc2$, wherein Vf is a path velocity vector to move the probe along the scanning path, Ve is a deflection correcting vector to keep the amount of deflection of the probe to the workpiece to be the reference amount of deflection, and is given by $K(|Ep|-E0)eu$ where Ep is sensor output of the probe, E0 is the reference amount of deflection, and eu is a unit vector in a displacement direction of the probe, Vc1 is a first trajectory correcting vector which is parallel to a perpendicular from the probe portion to the nominal scanning path, in order to correct a position of the probe so that the stylus tip heads to the scanning path, q is a trajectory correcting direction vector calculated by a vector product of the unit vector in a displacement direction of the probe eu and the path velocity vector Vf, Vc2 is a second trajectory correcting vector determined by the first trajectory correcting vector Vc1 and the trajectory correcting direction vector q, and represented by $(Vc1\cdot q)q$, Gf, Ge, and Gc are a scanning driving gain, a deflection correcting gain, and a trajectory correcting gain respectively, and a direction of the second trajectory correcting vector Vc2 is orthogonal to the unit vector eu having the probe displacement direction and the path velocity vector Vf, and controlling movement of the probe in the shape measuring apparatus based on the combined velocity vector V, wherein Vc2 is parallel to a contact portion of the workpiece where the stylus tip contacts the workpiece and, Vc2 is perpendicular to eu and Vf.

* * * * *